United States Patent

Sugiura et al.

[11] Patent Number: 6,084,841
[45] Date of Patent: Jul. 4, 2000

[54] OPTICAL PICKUP DEVICE HAVING HEAT RADIATING MECHANISM

[75] Inventors: Satoshi Sugiura; Akihiro Tachibana; Yoshihisa Kubota, all of Tsurugashima, Japan

[73] Assignee: Pioneer Electronic Corporation, Tokyo, Japan

[21] Appl. No.: 09/021,938

[22] Filed: Feb. 11, 1998

[30] Foreign Application Priority Data

Mar. 21, 1997 [JP] Japan ................................ 9-067720

[51] Int. Cl.[7] ........................................... G11B 7/00
[52] U.S. Cl. ........................................ 369/112; 369/120
[58] Field of Search ................................. 369/103, 109, 369/110, 112, 120, 100, 101, 121

[56] References Cited

U.S. PATENT DOCUMENTS 5,703,856  12/1997  Hayashi et al. ................. 369/112 X
5,717,675  2/1998  Yamamoto ........................ 369/103 X

FOREIGN PATENT DOCUMENTS

7-98431  4/1995  Japan .

Primary Examiner—Paul W. Huber
Attorney, Agent, or Firm—Morgan, Lewis & Bockius LLP

[57] ABSTRACT

An optical pickup device includes at least four light-receiving-surface elements, at least two semiconductor lasers, and an optical system for irradiating a light beam onto an optical recording medium through an objective lens for forming a light spot onto an information recording surface thereof. The optical system guides the return light from the light spot to the four light-receiving-surface elements through the objective. The semiconductor lasers are mounted on a plurality of flat side surfaces of a single heat sink which do not exist on a common virtual plane.

14 Claims, 12 Drawing Sheets

OPTICAL PICKUP DEVICE HAVING HEAT RADIATING MECHANISM

BACKGROUND OF THE INVENTION

1. Field of the Invention

The present invention relates to an optical pickup device or optical head device and particularly to an optical system of an optical pickup device in an optical recording and reproducing apparatus.

2. Description of Related Art

For optical information recording mediums, various kinds of optical discs, called Laser Disc (LD), Compact Disc (CD), Digital Video Disc (DVD) and the like have been known. As an optical recording and reproducing apparatus for writing and reading information from an optical recording medium, there is an optical disc player. In such optical discs, normalization is made for each item such as the base thickness in different specifications. There is also a compatible disc player which can read information from those different optical discs.

In the compatible video disc player, an optical pickup device has an optical system for irradiating a light beam to the optical disc and reading the return light from the optical disc. A method for controlling a position of the optical pickup device at a high precision is always demanded in a tracking servo control of the optical pickup device. A knife edge method, a phase difference method, a push-pull method, or the like is used for the tracking servo control method.

For example, in the optical discs of CD and DVD, a numerical aperture NA, a thickness of substrate, an optimum reading light wavelength, and the like are designed on the basis of different specifications. To realize an optical pickup device of a CD/DVD compatible player, therefore, it is necessary to correct at least two differences regarding the numerical apertures NA and the thicknesses of the substrates.

An example of an optical pickup device with two focal points is realized using a hologram lens has been disclosed in Japanese Patent No. 2532818; JP-A-7-98431. This two focal point optical pickup device comprises a complex objective lens composed of a convex objective lens and a hologram lens. In the hologram lens, a plurality of diffraction grooves or ring-shaped concave and convex portions are concentrically formed on a transparent flat plate over the region corresponding to the numerical aperture for the CD. These diffraction grooves diffract an incident light beam so as to divide it into a zero-order, a first-order and higher-order diffraction light beams. Thus, the hologram lens functions as a concave lens for the first-order diffraction light beam, whereby each focal point is formed on corresponding one of recording surfaces of the optical discs. At this time, the light beam is allowed to transmit through the region where no diffraction groove is formed, without being diffracted, and this transmitted light is received by the objective lens together with the zero-order diffraction light. As a result, the transmitted light, the zero-order diffraction light, and the first-order diffraction light will have different numerical apertures, respectively. The first-order diffraction light diffracted by diffraction grooves is employed for reading a CD with a small numerical aperture. The transmitted light and the zero-order diffraction light of larger numerical numbers are employed for reading a DVD.

The structure of the above conventional the two focal point optical pickup device principally involves the formation of reading spots with a common single light source. This light source emitting a reading light of a wavelength as great as 650 nm, which is most suitable for the DVD, is normally used. However, a light most suitable for reading out a recordable/reproducible recording medium has a wavelength as great as 780 nm, which is called a CD-R (CD Recordable or an R-CD: Recordable CD) belonging to the CD group. Specifically, the light source having the wavelength as great as 650 nm is not suitable for reading out information recorded on the CD-R.

Therefore, in order to achieve a compatible player capable of performing a good recording/reproducing of information for the CD-R in addition to the DVD/CD, it is necessary to overcome the problem of at least three differences regarding the numerical apertures NA, substrate thicknesses, and wavelength 780 nm of reading light. To realize an optical pickup device of a compatible player of LD/CD/DVD/CD-R, it is necessary to construct an optical pickup device using a plurality of light sources of different wavelengths, each light source being suitable for corresponding one of the different discs, after resigning the construction using the single light source for a single wavelength.

When an optical system such as prism, lens, or the like is easily constructed by using a plurality of light sources, however, the whole of the optical pickup device is complicated and there is a tendency of an increase in size.

Since an emission wavelength of each semiconductor laser sensitively changes in accordance with the change of ambient temperature, it is necessary to perform a temperature management. If there is a plurality of semiconductor lasers, therefore, a countermeasure for heat radiation of them is important.

SUMMARY OF THE INVENTION

The invention is made in consideration of the above problems. It is an object of the invention to provide an optical pickup device having a heat radiating mechanism which can be miniaturized and is suitable for an astigmatism method using light intensity detecting means e.g., a four-quadrant photodetector having four light-receiving-surface elements divided by two orthogonal line segments or dividing lines.

According to the invention, the above object is accomplished by an optical pickup device which comprises; at least one light intensity detecting means having four light-receiving-surface elements; at least two semiconductor lasers each emitting a light beam; and an optical system including an objective lens for irradiating the light beams onto an optical recording medium through the objective lens, forming a light spot onto an information recording surface thereof, and guiding the return light from the light spot to the four light-receiving-surface elements through the objective lens while a relative position of the light spot of a recording portion on the information recording surface for a track direction is controlled and recorded information is read from the optical recording medium, wherein the semiconductor lasers are mounted on a single heat sink at a plurality of flat side surfaces respectively which do not exist on a common virtual plane.

In the above optical pickup device, said semiconductor lasers are mounted near an edge or corner of said side surfaces so as to be away from each other via said edge or corner, said edge or corner being rounded, chamfered, or divided into a plurality of edges or corners.

In the above optical pickup device, said objective lens is a finite conjugate type objective lens.

In the above optical pickup device, said objective lens is a lens system in which a converging lens is arranged on a side of said optical recording medium and a collimator lens is arranged on a side of said semiconductor laser.

In the above optical pickup device, said optical system includes a semi-transparent mirror prism comprising a partially wedge-shaped flat plate made of an isotropic transparent optical material, in which one of parallel main planes of the flat plate is used as an incident main plane and the other main plane is used as an emitting plane and a wedge plane is defined by a flat plane intersecting said incident main plane at a predetermined angle;

wherein said optical system is constructed in such a manner that, in an forward optical path in which a divergent light beam emitted by one of said semiconductor lasers travels to said incident main plane at which the incident light beam is refracted to an inner-plane of said emitting plane at which the refracted light beam is partially reflected to said wedge plane at which the partially reflected light beam is refracted to said objective lens at which the refracted light beam is converged onto said optical disc for forming a light spot onto said information recording surface thereof, said incident main plane, said wedge plane and said objective lens substantially do not generate any astigmatism and, at the same time, in an backward optical path in which a return light from said light spot of the optical disc is received by said objective lens at which the received light beam is converged onto said wedge plane at which the converged light beam is refracted to said emitting plane at which the refracted light beam is refracted to said four light-receiving-surface elements, said emitting plane, said wedge plane and said emitting plane give an astigmatism suitable for said four light-receiving-surface elements to said return light; and wherein the other of said semiconductor lasers is arranged in such a manner that a divergent light beam emitted by the other of said semiconductor lasers is reflected by an outer surface of said wedge plane at which the reflected light beam is guided to said objective lens along with said forward optical path.

In the above optical pickup device, said optical system has a hologram optical device, said hologram optical device comprises a parallel flat plate made of an isotropic or anisotropic optical material formed with a diffraction relief for transmitting the light beam emitted by said semiconductor laser, guiding at least zero-order or first-order diffraction light to said objective lens, transmitting said return light, and guiding said at least the zero-order or first-order diffraction light to said four light-receiving-surface elements.

In the above optical pickup device, said optical system has a ¼ wavelength plate and a polarization hologram optical device, and said polarization hologram optical device is made up of a uniaxial crystal plate in which a diffraction relief is formed on a main plane, transmits said light beam having a plane of vibration, diffracts the light having said plane of vibration in the direction perpendicular to said plane of vibration, and guides said return light from said light spot irradiated through said ¼ wavelength plate and said objective lens to said optical recording medium to said four light-receiving-surface elements via said ¼ wavelength plate and said polarization device, and said diffraction relief causes an astigmatism.

According to the invention, there is no need to provide individual heat sinks for a plurality of semiconductor lasers and a common single heat sink having edges or corners whose surface areas are larger than a volume is used, so that a heat radiation of a plurality of semiconductor lasers can be effectively performed. The optical pickup device optical system, therefore, can be simplified.

DETAILED DESCRIPTION OF THE PREFERRED EMBODIMENTS

Embodiments of the present invention will now be described below with reference to the accompanying drawings.

<First Embodiment>

Figure 1:
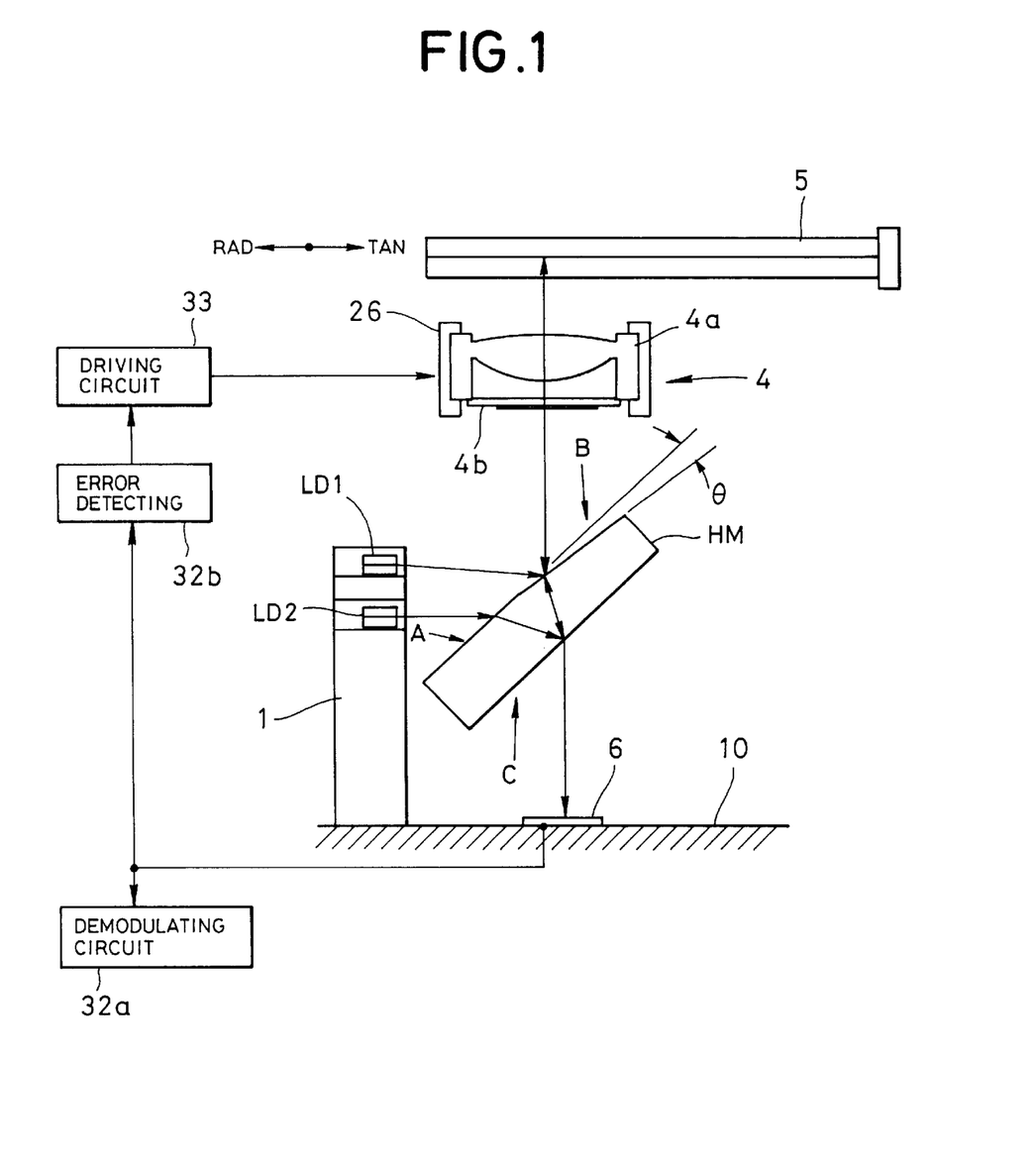
FIG. 1 is a schematic constructional diagram in an optical pickup device using a semi-transparent mirror prism or half mirror prism according to the first embodiment of the invention.
Figure 2:
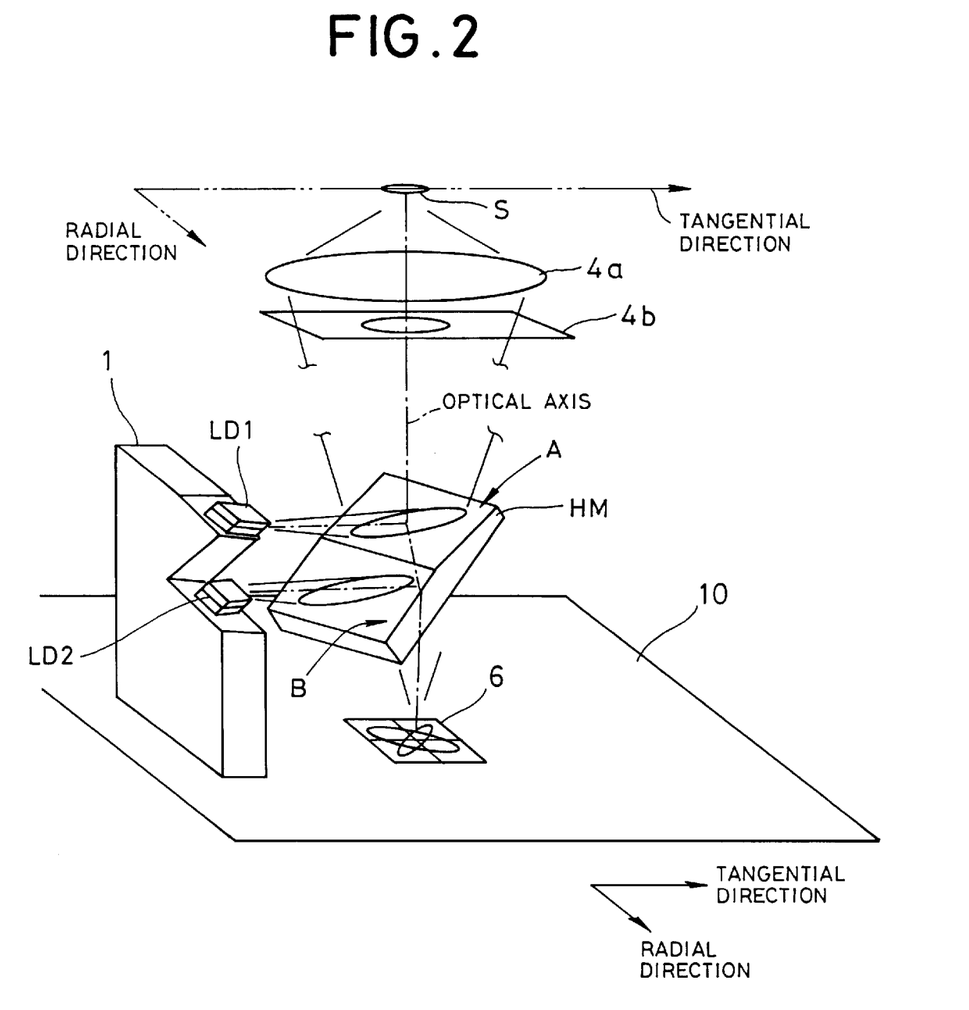
FIG. 2 is a schematic perspective view in the optical pickup device using the semi-transparent mirror prism according to the first embodiment of the invention.

FIGS. 1 and 2 schematically show an optical pickup device used for a recording and reproducing apparatus according to the first embodiment. In a body of the optical pickup device, a semiconductor laser LD1 (for example, wavelength of 650 nm) for reading a DVD and a semiconductor laser LD2 (for instance, wavelength of 780 nm) for reading a CD are attached onto a common single heat sink 1 as these semiconductor lasers serve as light sources individually. A semi-transparent mirror prism or half mirror prism HM, a complex objective lens 4 for converging a light beam onto an optical disc 5 and forming a light spot thereon, and a photodetector 6 of four light-receiving-surface elements for receiving a reflected light from the light spot are further provided as arranged in a common optical axis in the pickup body.

Each of the semiconductor lasers emits a divergent light beam which has an elliptic cross sectional intensity having a major longitudinal axis extending in the direction perpendicular (or parallel) to the junction interface. The light beam has a plane of field vibration in the direction parallel (or perpendicular) to the junction interface. The heat sink 1 for the semiconductor lasers LD1 and LD2 is fixed onto a substrate 10. The photodetector 6 of four light-receiving-surface elements to detect a light intensity is formed on the substrate 10 under the half mirror prism HM.

The complex objective lens 4 is made up of a converging lens 4a and a Fresnel lens or hologram lens 4b. The converging lens is a convex lens based on a finite conjugate type objective lens system specification for converging the incident light beam on the optical disc. The hologram lens 4b of a transparent flat plate is arranged coaxially with the optical axis of the converging lens and functions as a concave lens. The converging lens 4a and hologram lens 4b are arranged to a cylindrical holder so as to be away from each other at a predetermined distance and are held so that they can freely move in parallel and are rotatable for the optical axis of the cylindrical holder. The hologram lens in the complex objective lens 4 is not limited to per se. The converging lens itself can be constructed as a single complex objective lens with two focal points. In place of the hologram lens 4b, a liquid crystal device may be used for changing a numerical aperture.

The pickup body accommodates an objective lens driving mechanism 26 including a tracking actuator and a focusing actuator. The focusing actuator moves the complex objective lens 4 in the direction perpendicular to the information recording surface of the optical disc 5. The tracking actuator drives the complex objective lens 4 in the radial direction of the optical disc 5. A slider mechanism (not shown) for coarsely moving the lens in the radial direction is also included in the objective lens driving mechanism 26.

The optical pickup device as mentioned above has a common optical system in both the optical forward and backward paths. That is, the optical system irradiates the light beam from each semiconductor laser onto the optical disc 5 through the converging lens 4a of the finite conjugate type objective lens system so as to form a light spot S onto the information recording surface in the optical forward optical path. The optical system receives the return light from the light spot through the objective lens 4, then converges and guides it to the four light-receiving-surface elements 6 in the backward optical path.

The semi-transparent mirror prism HM of the optical system is fixed onto the substrate 10 with a support (not shown) and is designed and arranged so as to allow the divergent light beams of the semiconductor lasers LD1 and LD2 to pass along a common optical path. The semi-transparent mirror prism HM is a partially wedge-shaped flat plate made of a transparent isotropic optical material as a whole. One of the main planes of the flat plate is labeled as an incident main plane A. The other main plane on the back side of mirror prism HM is labeled as an emitting plane C. A wedge plane labeled as B is defined by a flat plane intersecting the incident main plane A at a predetermined angle θ. The wedge plane B is obtained by grinding and polishing a part of the incident main plane A. In this way, the partially wedge-shaped flat plate HM is defined by the incident main plane A, the wedge plane B and the emitting plane C.

The semi-transparent mirror prism HM included in the optical system is designed as one example, as follows:

First, the measurement of the semi-transparent mirror prism HM is decided by using parameters in such a manner that the incident main plane A, the wedge plane B and the objective lens 4 substantially hardly cause any astigmatism in a forward optical path in which a divergent light beam emitted by the fixed semiconductor laser LD2 travels to the incident main plane A at which the incident light beam is refracted to an inner-plane of the emitting plane C at which the refracted light beam is partially reflected to the wedge plane B at which the partially reflected light beam is refracted to the objective lens 4 at which the refracted light beam is converged onto the optical disc 5 for forming a light spot S onto the information recording surface thereof and, at the same time, the wedge plane B and emitting plane C give an astigmatism suitable for the four light-receiving-surface elements 6 to the return light in a backward optical path in which a return light from the light spot of the optical disc 5 is received by the objective lens 4 at which the received light is converged onto the wedge plane B at which the converged light beam is refracted to the emitting plane C at which the refracted light beam is refracted to the four light-receiving-surface elements 6. The used parameters includes the positions of the semiconductor lasers LD1 and LD2 and the four light-receiving-surface elements 6 with respect to the optical axis, the angle θ of the wedge plane B with respect to the incident main plane A and, an angle between the wedge plane B and the emitting plane C, an angle between the incident main plane A and the emitting plane C, each incident angle, each emission angle, a plate thickness, a refractive index which are respectively changed in consideration of wavelengths and radiation angles of the semiconductor laser beams and the specification of the optical disc substrate and the objective lens, thereby setting optimum values of the semi-transparent mirror prism HM. Then the positions of the semiconductor lasers LD1 and LD2 are amended and set such that the divergent light beam from the semiconductor laser LD1 is reflected by the outer surface of the wedge plane B and guided to the objective lens 4 for making a light spot on the optical disk. The optimum values for the semi-transparent mirror prism HM are also amended and set in consideration of the convergent return light caused by the objective lens in the backward optical path.

An outline of the recording and reproduction will now be described. When a DVD is playbacked or reproduced, the laser beam from the semiconductor laser LD1 is reflected by the wedge plane B of the semi-transparent mirror prism HM and is guided to the complex objective lens 4. The hologram lens 4b mainly divides the light beam into a zero-order diffraction light and a first-order diffraction light through its diffracting function. Those diffracted light beams are converged toward the optical disc 5 by the converging lens 4a, so that a light spot is formed on a pit train of the information recording surface of the optical disc 5. During the reproduction of DVD, the zero-order diffraction light diffracted by the hologram lens 4b transmits through the hologram lens together with the ambient transmission light, like passing through a parallel flat glass, and is converged onto the optical disc at a numerical aperture NA of 0.6 by the setting of the distance between the objective lens and the optical disc, thereby forming a small light spot.

When a CD is reproduced or a CD-R is recorded or reproduced, the laser beam from the semiconductor laser LD2 passes through the incident main plane A of the semi-transparent mirror prism HM, and it is reflected by the inner surface of the emitting plane C, and it is guided to the complex objective lens 4 via the wedge plane B. In the first-order diffraction light diffracted by the hologram lens 4b, the hologram lens 4b functions as a concave lens. Since the first-order diffraction light beam portion extends the focal distance of the complex objective lens, the numerical aperture NA is reduced to 0.47, and the light spot is formed on the CD or CD-R. The remaining diffraction lights are not focused onto the information recording surface of the CD or CD-R but are in a state that light intensities are insufficient to record or reproduce the data.

All of the reflection light from the light spots of the information recording surface of the optical disc enter the wedge plane B of the semi-transparent mirror prism HM through the objective lens 4 and passes through the emitting plane C and enters the four light-receiving-surface elements 6 of the photodetector.

Figure 3A:
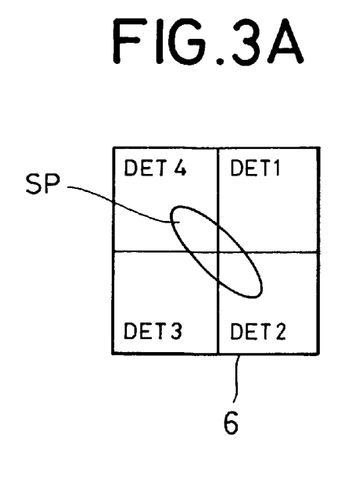
FIGS. 3A, 3B and 3C are plan views of four light-receiving-surface elements of photodetectors of the embodiment.
Figure 3B:
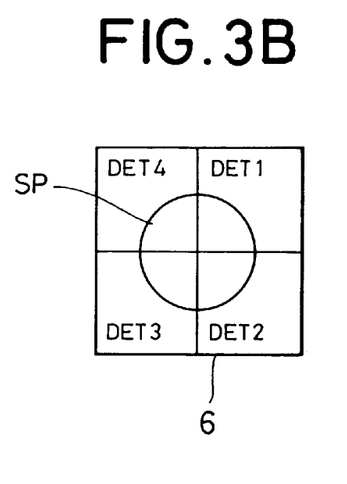
Figure 3C:
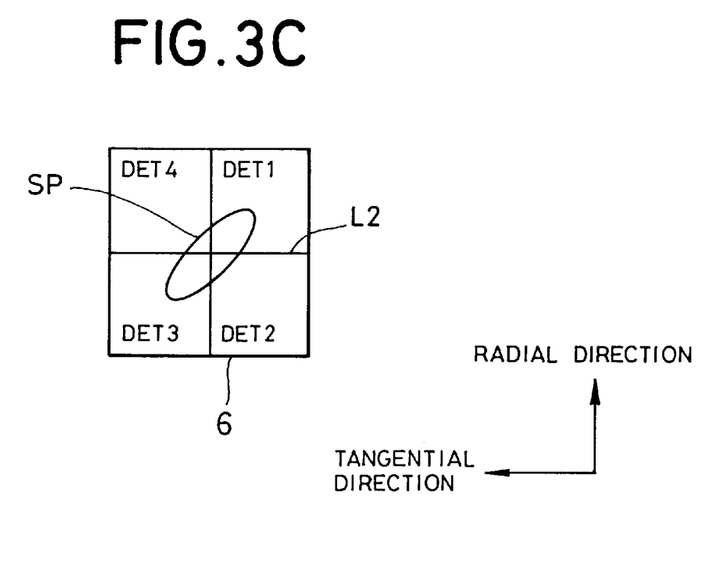

As show n in FIG. 3, the four light-receiving-surface elements 6 are constructed by four elements DET1 to DET4 of the first to fourth quadrants which are closely arranged by using two dividing lines L1 and L2 which cross perpendicularly as boundary lines and are mutually independent. The four light-receiving-surface elements 6 are arranged on the substrate 10 under the semi-transparent mirror prism HM in a manner such that one of the dividing lines is parallel with the track direction (also referred to as a tangential direction) of the information recording surface and the other dividing line is parallel with the radial direction of the optical disc. Those dividing directions also coincide with the dividing directions in case of performing the tracking servo based on the phase difference method (time difference method).

When the light spot is focused on the information recording surface, the light spot of a true circle SP is formed on the four light-receiving-surface elements as shown in FIG. 3A in which a spot intensity distribution is symmetrical with respect to a center O of the four light-receiving-surface elements 6, namely, it is symmetrical in the track and the radial directions. In this case, voltage values obtained by respectively adding photoelectric conversion outputs of the elements existing on the diagonal lines are, consequently, equal to each other and a focusing error component is equal to "O". When the light spot is out of focus, as shown in FIG. 3B or 3C, a light spot of an ellipse SP which is elliptical in the diagonal direction of the elements is formed on the four light-receiving-surface elements 6, so that focusing error components which are derived by respectively adding the photoelectric conversion outputs of the elements existing on the diagonal lines have opposite phases. That is, now assuming that DET1 to DET4 indicate corresponding outputs, an output of {(DET1+DET3)−(DET2+DET4)} becomes a focusing error signal. An output of {(DET1+DET4)−(DET2+DET3)} becomes a tracking error signal. An output of (DET1+DET2+DET3+DET4) becomes an RF signal.

When a spot image is formed near the center of the four light-receiving-surface elements 6 as mentioned above, the photodetector supplies an electric signal to a demodulating circuit 32a and an error detecting circuit 32b in accordance with the spot images formed on the four light-receiving-surface elements 6. The demodulating circuit 32a creates a recording signal on the basis of the electric signal. The error detecting circuit 32b generates a focusing error signal, a tracking error signal, another servo signal, and the like on the basis of the electric signal to supply them to the corresponding actuators through an actuator driving circuit 33. The actuator driving circuit 33 drives the complex objective lens 4 and the like actuators under the servo-control in accordance with the driving signals.

<Layout of the Semiconductor Lasers in the First Embodiment>

An example of a layout of the semiconductor lasers LD1 and LD2 of the first embodiment will now be described. In the optical system, when the irradiated spot traverses the pit train (track) due to an erroneous tracking operation, an amount of return light of the portion corresponding to the shadow of the track fluctuates on the four light-receiving-surface elements. According to the astigmatism focusing method, the error signals are generated on the basis of the output differences of the diagonal elements in the four light-receiving-surface elements. Thus, if the shadow of the track image is projected onto the diagonal elements, the tracking error signal exerts an influence on the focusing error signal. It is, therefore, necessary to make the extending direction of the shadow of the track image to coincide with the direction of the dividing line of the four light-receiving-surface elements. Since the directions of the dividing lines of the four light-receiving-surface elements are, thus, defined by the direction of the pit train (track) of the information recording surface, as shown in FIG. 4, the directions of the astigmatism axes to be generated are also limited to the diagonal directions of the four light-receiving-surface elements 6.

Figure 4:
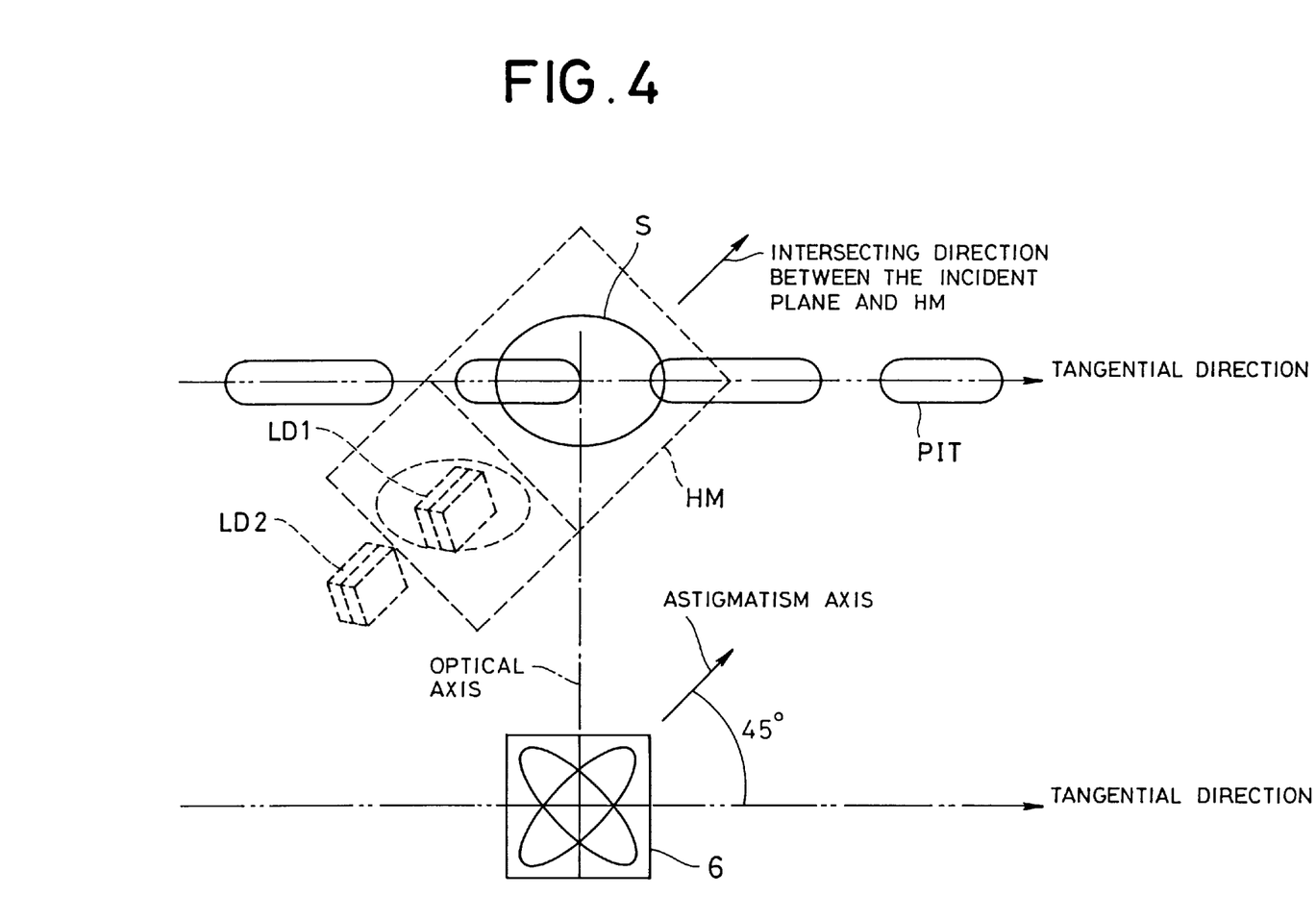
FIG. 4 is a schematic diagram for explaining a layout of semiconductor lasers, the semi-transparent mirror prism, tracks, and four light-receiving-surface elements in the optical pickup device shown in FIG. 2.

Since the astigmatism of the semi-transparent mirror prism HM occurs in the planes of incidence of the optical axis of the convergent light beam to the incident main plane A and wedge plane B, as shown in a fluoroscopic perspective view seen from the information recording surface side of the optical disc in FIG. 4, the semi-transparent mirror prism HM needs to be arranged over the four light-receiving-surface elements 6 so that a line on which the main plane of the prism intersects the plane of incidence of the optical axis is set to an angle of 45° with respect to the pit train direction of the optical recording medium.

The semiconductor lasers are ordinarily arranged in a manner such that a vertical lateral mode in the light spot S which is formed on the information recording surface, i.e., the longitudinal axial direction of a far field pattern corresponds to the tangential direction of the information recording surface of the optical disc and that a horizontal lateral mode corresponds to the radial direction of the optical disc. This is because when a width of light spot S is large, a unwanted influence of the cross-talk from the adjacent track increases.

As shown in FIGS. 1, 2, and 4, the semiconductor lasers LD1 and LD2, therefore, are obliquely arranged from the horizontal direction so that the major axes of the far field patterns of the semiconductor lasers are aligned in the diagonal directions of the incident main plane A and wedge plane B of the semi-transparent mirror prism HM.

Figure 5:
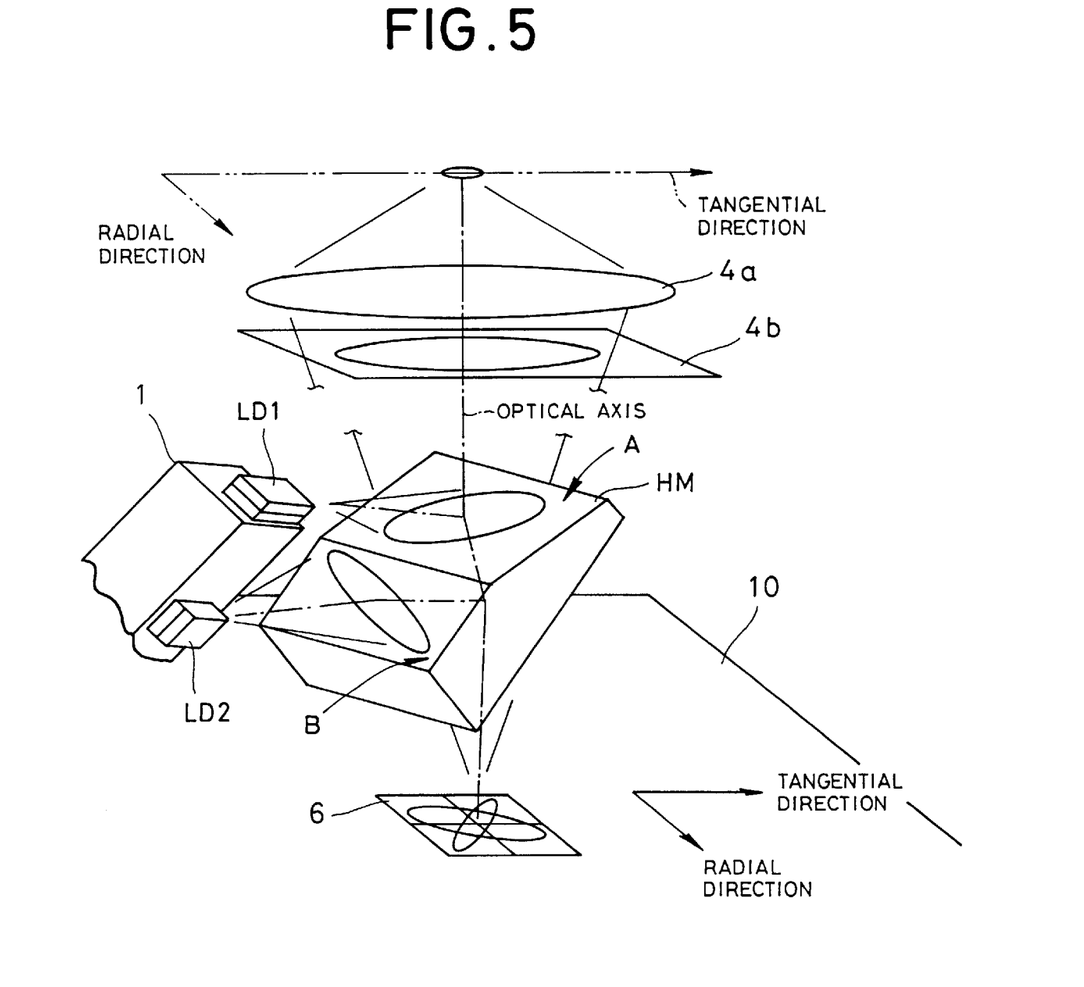
FIG. 5 is a schematic perspective view in the optical pickup device using the semi-transparent mirror prism showing a layout of other semiconductor lasers according to the first embodiment of the invention.
Figure 6:
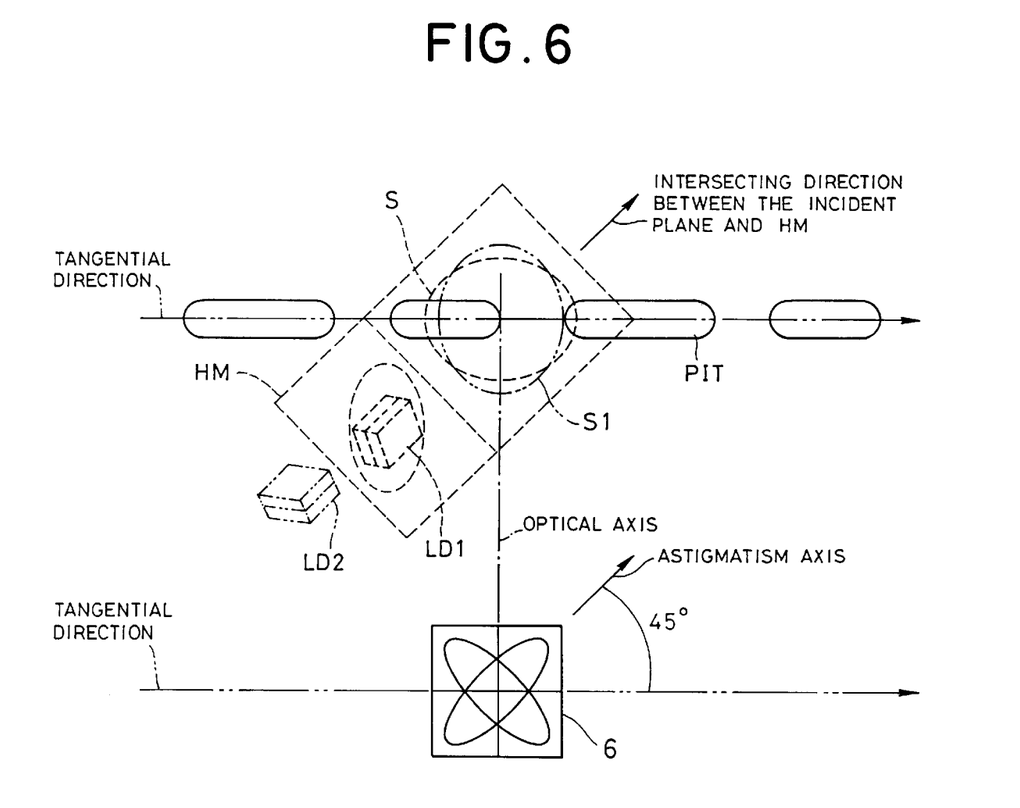
FIG. 6 is a schematic diagram for explaining a layout of the semiconductor lasers, the semi-transparent mirror prism, tracks, and four light-receiving-surface elements in the optical pickup device shown in FIG. 5.

As another layout, as shown in FIGS. 5 and 6, for instance, the semiconductor lasers LD1 and LD2 can be also arranged so that the major axis of the spot S1 caused by the far field pattern of the semiconductor laser LD2 is vertical to the track direction.

Figure 7A:
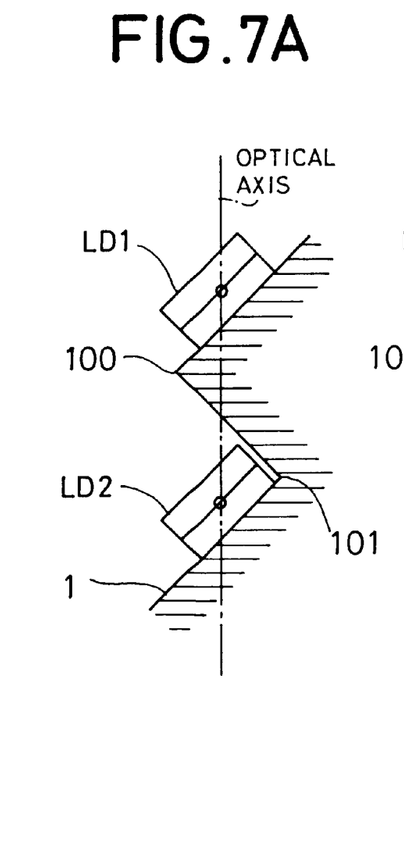
FIGS. 7A, 7B, 7C and 7D are partial schematic front views of heat sinks and semiconductor lasers each showing a layout of the semiconductor laser according to the first embodiment of the invention.
Figure 7B:
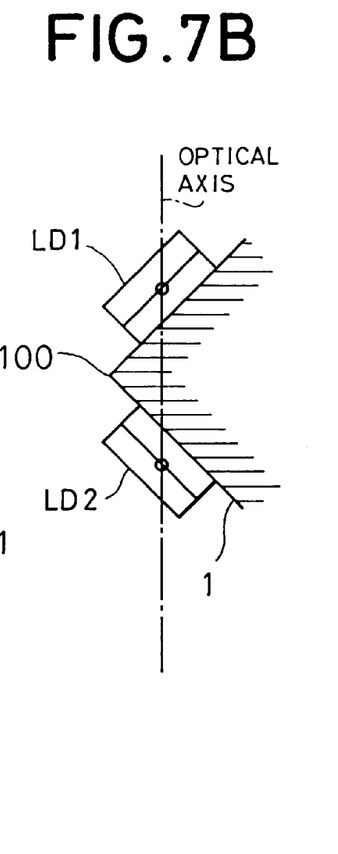
Figures 7C, 7D:
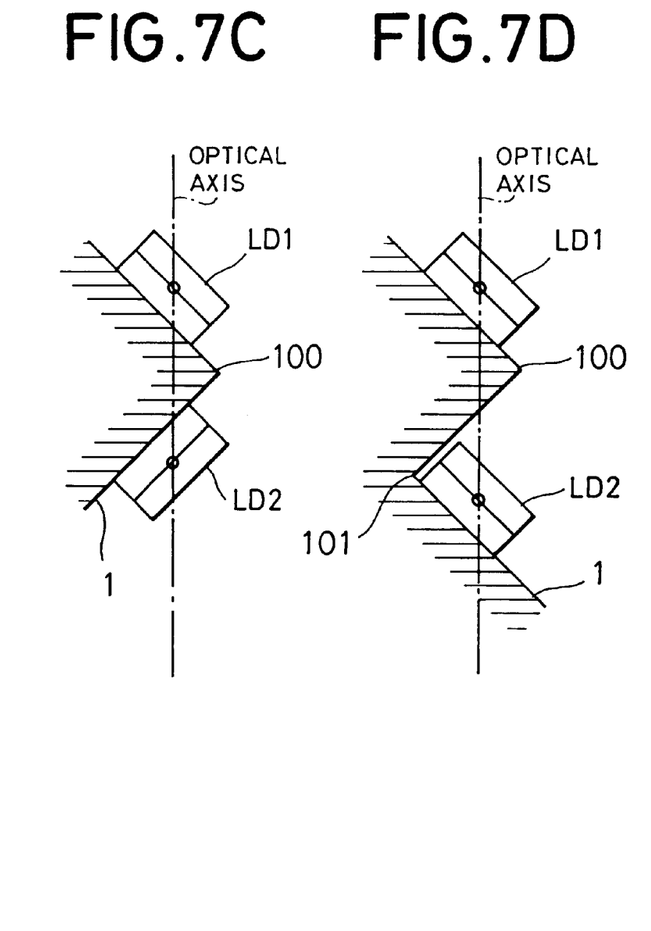
Figure 8A:
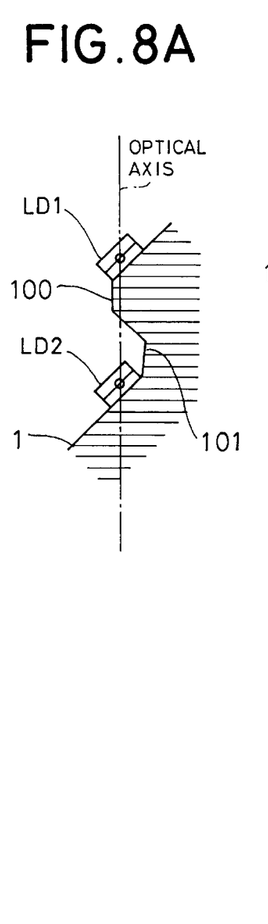
FIGS. 8A, 8B and 8C are partial schematic front views of edges and corners of the heat sinks according to the invention.
Figure 8B:
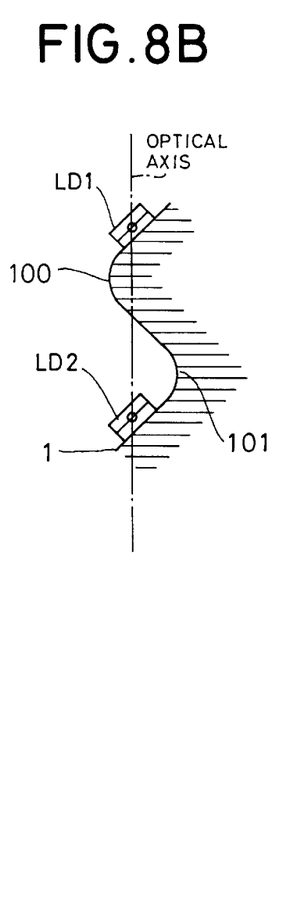
Figure 8C:
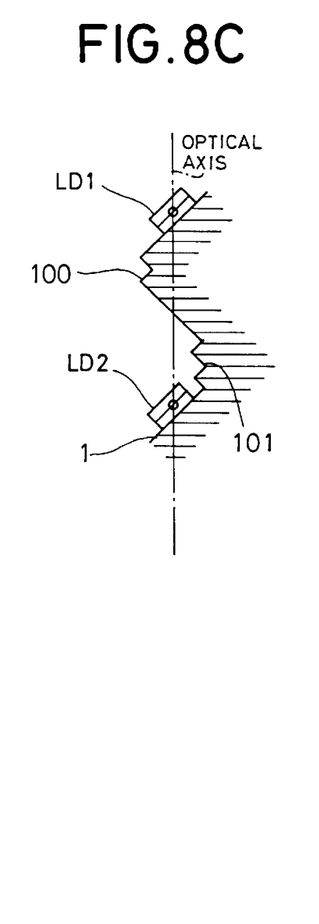

In those cases, layouts of cleaved mirrors of the semiconductor lasers LD1 and LD2 directing the incident main plane A and wedge plane B of the semi-transparent mirror prism HM are as shown in FIGS. 7A and 7B. The lasers are arranged near an edge 100 or a corner 101 formed on the single heat sink 1 so as to be away from each other via the edge 100 or corner 101. As shown in FIGS. 7c and 7D, the semiconductor lasers LD1 and LD2 are arranged in a manner such that junction interfaces of the semiconductor lasers are inclined at almost 45° with respect to the optical axis or a line on which the two light emitting portions of the lasers exist. As shown in FIGS. 8, the edge 100 or corner 101 can be also chamfered (FIG. 8A) or rounded (FIG. 8B) or divided into a plurality of edges or corners (FIG. 8C).

<Second Embodiment>

Figure 9:
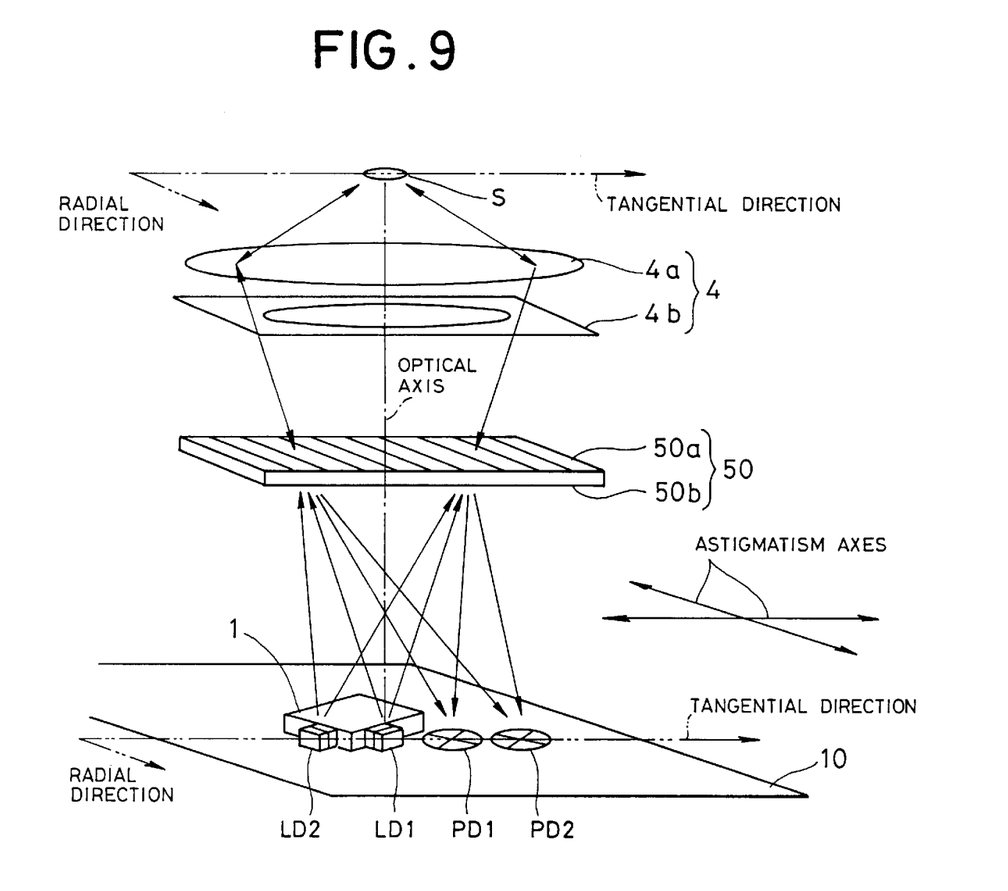
FIG. 9 is a schematic perspective view of an optical pickup device using a hologram optical device according to the second embodiment of the invention.

FIG. 9 shows an outline of an optical pickup device of a recording and reproducing apparatus according to the second embodiment using a hologram device 50 as a common optical system for irradiating a light beam onto the optical recording medium through an objective lens to form a light spot on the information recording surface thereof, and then to guide the return light from the light spot to the four light-receiving-surface elements through the objective lens. In a pickup body, the semiconductor lasers LD1 and LD2 serving as light sources are mounted on the common single heat sink 1. The common single heat sink 1 is fixed onto the substrate 10 together with the heat sink 1 so as to irradiate the light beams upward of the substrate 10. In the pickup body, the hologram optical device 50 is mounded so as to commonly use the optical axis of the complex objective lens 4 for converging the light beam onto the optical disc 5 to form the light spot. The complex objective lens 4, hologram optical device 50, and substrate 10 are arranged almost in parallel to each other. Two photodetectors PD1 and PD2 of four light-receiving-surface elements for detecting the light intensity are arranged on the substrate 10 in parallel to a line on which the light emitting portions of the semiconductor lasers LD1 and LD2 exist so as to receive the reflected light from the light spot through the complex objective lens and the hologram optical device.

A complex objective lens and an objective lens driving mechanism similar to those in the above embodiment are provided for the pickup body.

The hologram optical device 50 has a diffraction relief, i.e., a diffraction grating 50a on the side of the object lens 4. Each of the stripes of the diffraction gratings 50a of the hologram optical device 50 is arranged almost perpendicularly to the track direction at a predetermined pitch. The diffraction grating 50a is formed on a parallel flat plate 50b of a transparent isotropic or anisotropic optical material. During the DVD playback, the diffraction grating 50a receives a light beam emitted from the semiconductor laser LD1 to create and guide a zero-order diffraction light to the objective lens 4 to make a light spot S on an information recording surface, and then the diffraction grating 50a receives a return light from the light spot S of the zero-order diffraction light to create and guide a first-order diffraction light to the four light-receiving-surface elements PD1. In the case of the CD or CD-R playback, the diffraction grating 50a receives a light beam emitted from the semiconductor laser LD2 to create and guide a first-order diffraction light to the objective lens 4 to make a light spot S on the information recording surface, and then the diffraction grating 50a receives a return light from the light spot S of the first-order diffraction light, and guiding a first-order diffraction light to the four light-receiving-surface elements PD2.

In the irradiating optical system of the forward optical path, the laser beam from the light source of each semiconductor laser passes through the hologram device 50, and is converged as a light spot onto the pit train on the information recording surface of the optical disc 5 by the objective lens 4.

On the other hand, as for the backward optical path, in the same detection optical system as the irradiation optical system, the reflected light from the information recording surface again passes through the objective lens 4 and again passes through the hologram optical device 50. In this instance, since each first-order diffraction light obliquely passes through the parallel flat plate 50b after the diffraction grating 50a, as shown in FIG. 9, an astigmatism having astigmatism axes respectively coinciding with both of the track direction and the direction perpendicular thereto is given by the parallel flat plate. The return light of each of the deflected first-order diffraction light is converged and guided onto each of the corresponding photodetectors of four light-receiving-surface elements.

The diffraction grating 50a and parallel flat plate 50b in the hologram optical device 50 are designed in a manner such that each of the return first-order diffraction light to which the astigmatism is given forms a spot SP at a position near the center of the four light-receiving-surface elements. When the laser beam converged to the information recording surface of the optical disc is in-focused, the hologram optical device irradiates the light spot SP of a true circle onto the four light-receiving-surface elements in a manner similar to FIG. 3A. When the converged laser beam is out-of focus, what is called an astigmatism such that the light spot that is elliptical in the diagonal line directions of the elements is irradiated onto the four light-receiving-surface elements is caused in a manner similar to FIG. 3B or 3C.

<Layout of Semiconductor Lasers in the Second Embodiment>

An example of a layout of the semiconductor lasers LD1 and LD2 of the second embodiment will now be described.

Figure 10:
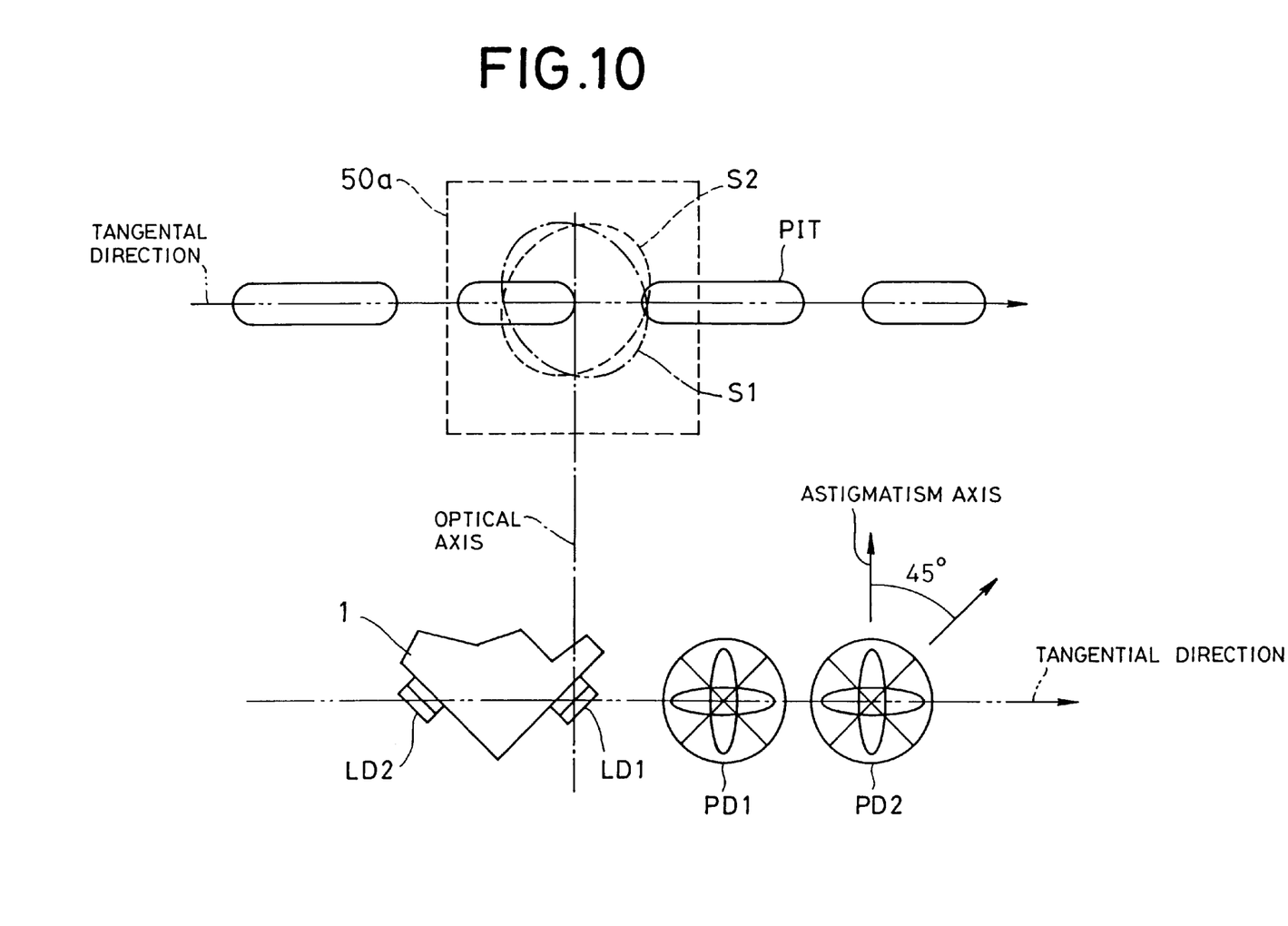
FIG. 10 is a schematic diagram for explaining a layout of semiconductor lasers, a hologram optical device, tracks, and four light-receiving-surface elements in the optical pickup device shown in FIG. 9.

Since the astigmatism of the hologram optical device 50 occurs in the plane of incidence where the first-order diffraction light caused by the diffraction grating 50a obliquely passes through the parallel flat plate 50b, as shown in a perspective diagram seen from the side of the optical disc's information recording surface of FIG. 10, the hologram optical device 50 needs to be arranged on the four light-receiving-surface elements PD1 and PD2 in a manner such that the direction where stripes of the diffraction grating 50a align, i.e., the direction substantially perpendicular to those stripes coincides with the tangential direction of the pit train. For this purpose, the photodetectors PD1 and PD2 of four light-receiving-surface elements are also arranged in the tangential direction of the pit train image on the substrate 10. Thus, since the astigmatism axes are perpendicular or parallel to the tangential direction, the dividing lines of the four light-receiving-surface elements PD1 and PD2 are aligned in the direction of 45° with respect to the tangential direction.

The directions of the astigmatism axes to be generated are, therefore, limited to the diagonal directions of the four light-receiving-surface elements PD1 and PD2. The directions of the dividing lines of the four light-receiving-surface elements are limited as shown in FIGS. 9 and 10 according to the directions of the astigmatism axes.

As shown in FIG. 10, the semiconductor lasers LD1 and LD2 are arranged in a manner such that the major longitudinal axes of the far field patterns S1 and S2 of the semiconductor lasers LD1 and LD2 are set to the direction of 45° with respect to the tangential direction to form a right angle between them.

Figure 11:
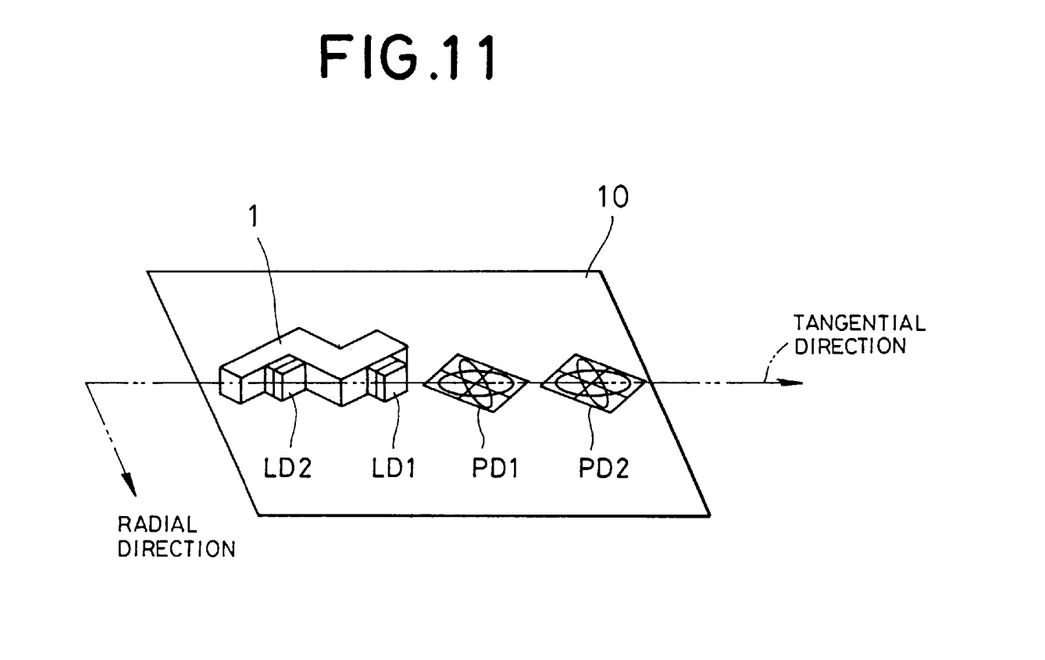
FIG. 11 is a schematic perspective view of semiconductor lasers showing another layout of the semiconductor lasers and four light-receiving-surface elements according to the second embodiment of the invention.

In another layout, as shown in FIG. 11, the semiconductor lasers LD1 and LD2 may be alternately arranged on the heat sink 1 so that the major longitudinal axes of the far field patterns of the semiconductor lasers are set to the direction of 45° for the tangential direction to be aligned in parallel to each other.

Figure 12:
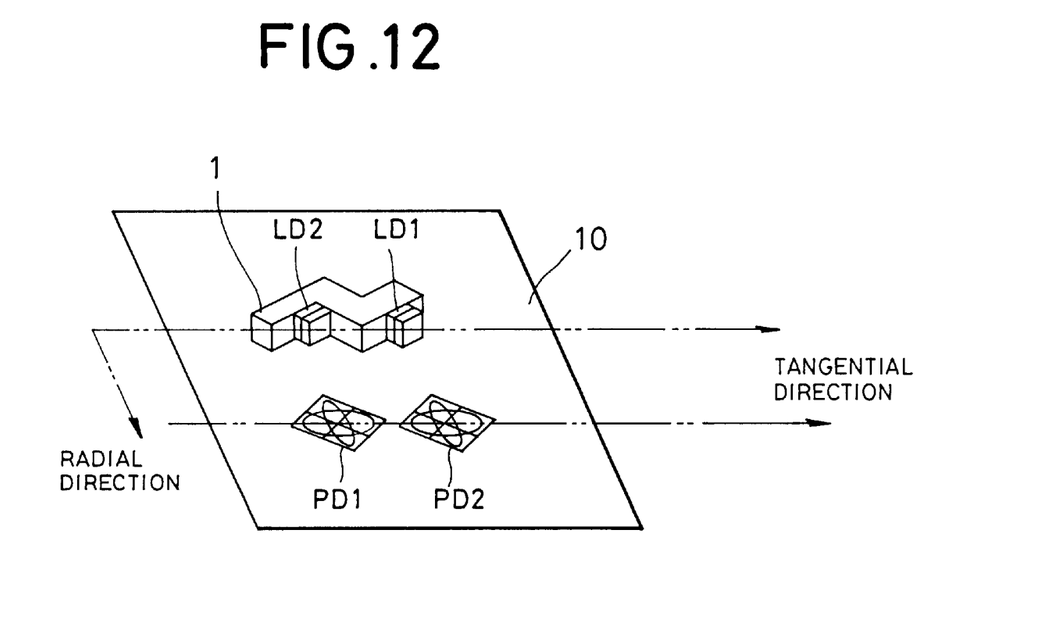
FIG. 12 is a schematic perspective view of semiconductor lasers showing another layout of the semiconductor lasers and four light-receiving-surface elements according to the second embodiment of the invention.

Although the semiconductor lasers LD2 and LD1 and four light-receiving-surface elements PD1 and PD2 are sequentially arranged in a line in the tangential direction in the above embodiment, they may be also symmetrically arranged with respect to a point on the substrate 10 as shown in FIG. 12 under the conditions that a conjugate optical system comprises a hologram optical device, an object lens, and a light spot in which light emitting points of the semiconductor lasers LD1 and LD2 are set to object points and at the same time, the centers of the four light-receiving-surface elements PD1 and PD2 are set to image points, respectively.

<Third Embodiment>

In an optical pickup device of the third embodiment according to the invention, a ¼ wavelength plate and a polarization hologram optical device may be also provided for the common optical system in place of the semi-transparent mirror prism HM of the above embodiment. In this case, the polarization hologram optical device is made of a uniaxial crystal plate in which a diffraction relief is formed on the main plane. This common optical system irradiates a laser beam of the semiconductor laser through the polarization hologram optical device, the ¼ wavelength plate and the objective lens onto the optical recording medium in turn to form a light spot, and then guides the return light from the light spot through the objective lens and the ¼ wavelength plate and the polarization hologram optical device to the four light-receiving-surface elements in turn. In this instance, the diffraction relief of the polarization hologram optical device causes an astigmatism as similar to the above embodiment. In the forward optical path, the polarization hologram optical device receives the light beam, as it is, from the semiconductor laser to transmit it the ¼ wavelength plate and the objective lens, the light beam having a plane of field vibration lying in the direction that is parallel with the junction interfaces of the semiconductor laser. In the backward optical path, this polarization hologram optical device receives and diffracts the return light from the ¼ wavelength plate, the return light having a plane of field vibration which is rotated around the optical axis by an angle of 90°.

Figure 13:
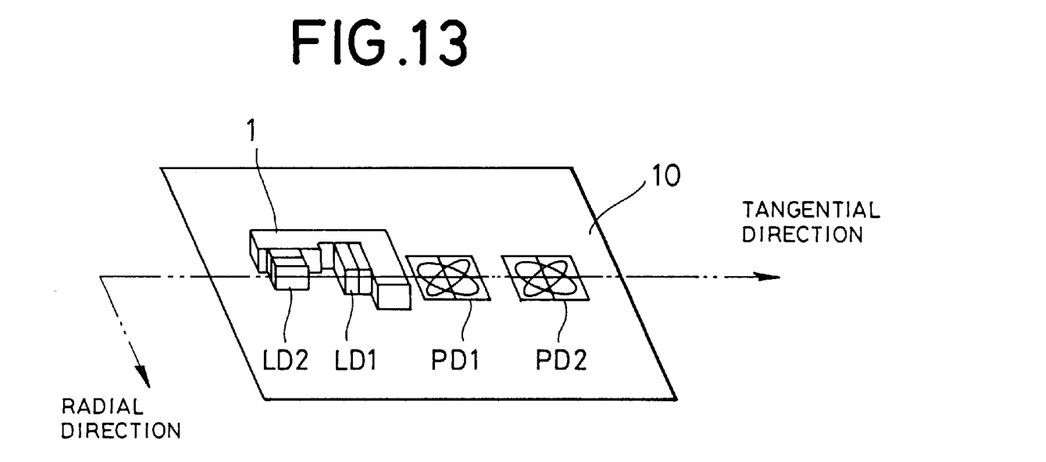
FIG. 13 is a schematic perspective view of semiconductor lasers showing a layout of the semiconductor lasers and four light-receiving-surface elements according to the third embodiment of the invention.

In this case, as shown in FIG. 13, the semiconductor lasers LD1 and LD2 and the four light-receiving-surface elements PD1 and PD2 are arranged in a line in the tangential direction of the pit train image on the substrate. Thus, the semiconductor lasers LD1 and LD2 are fixed to the heat sink 1 secured on the substrate 10 so that their junction interfaces are mutually vertical, and the four light-receiving-surface elements PD1 and PD2 are arranged on the substrate 10 so that one of the two orthogonal line segments coincides with the tangential direction of the pit train image on the substrate.

According to the objective lens, it will be obviously understood that an infinite conjugate type objective lens system may be employed instead of the finite conjugate type objective lens system, in which a converging lens is arranged on the side of the optical recording medium and a collimator lens is arranged on the side of the semiconductor laser. By this construction, There will be obtained a similar effect of the optical pickup device in the above embodiment, which has been described on the assumption that the objective lens is a finite conjugate type as a prerequisite.

According to the present invention, there is provided an optical pickup device which comprises at least one light intensity detecting means or photodetector having four light-receiving-surface elements, and at least two semiconductor lasers each generating light beam of an elliptic cross sectional intensity, the light beam having plane of vibrations lying in a direction parallel to the junction interface of the semiconductor laser and, the elliptic cross sectional intensity having a major longitudinal axis extending in a direction perpendicular to the junction interface. The optical pickup device further comprises an optical system for irradiating a light beam onto an optical recording medium through an objective lens to form a light spot onto an information recording surface thereof, and guiding the return light from the light spot to the four light-receiving-surface elements through the objective lens. While a relative position of the light spot of a recording portion on the information recording surface for a track direction is controlled, the recording information is read from the optical recording medium. The invention is characterized in that the semiconductor lasers are mounted near an edge or corner formed on a single heat sink so as to be away from each other via the edge or corner. Therefore, there is no need to provide individual heat sinks for a plurality of semiconductor lasers. Since the common single heat sink has an edge or corner, its surface area is large comparatively, so that large quantities of heat can be effectively radiated from the plurality of semiconductor lasers. The optical pickup device optical system, consequently, can be simplified.

What is claimed is:

1. An optical pickup device comprising:
   at least one light intensity detecting means having four light-receiving surface elements;
   at least two semiconductor lasers each emitting a light beam;
   an optical system including an objective lens for irradiating the light beams onto an optical recording medium through the objective lens, forming a light spot onto an information recording surface thereof, and guiding a return light from the light spot to the four light-receiving-surface elements through the objective lens while a relative position of the light spot of a recording portion on the information recording surface for a track direction is controlled and recorded information is read from the optical recording medium; and
   a single heat sink having at least two flat side surfaces which do not exist on a common virtual plane,
   wherein each of the semiconductor lasers is mounted on a respective flat side surface of the single heat sink.

2. An apparatus according to claim 1, wherein said semiconductor lasers are mounted near an edge or corner of said side surfaces so as to be away from each other via said edge or corner, said edge or corner being rounded, chamfered, or divided into a plurality of edges or corners.

3. An apparatus according to claim 1, wherein said objective lens is a finite conjugate type objective lens.

4. An apparatus according to claim 1, wherein said objective lens is a lens system in which a converging lens is arranged on a side of said optical recording medium and a collimator lens is arranged on a side of said semiconductor laser.

5. An apparatus according to claim 1, wherein said optical system includes a semi-transparent mirror prism comprising a partially wedge-shaped flat plate made of an isotropic transparent optical material, in which one of parallel main planes of the flat plate is used as an incident main plane and the other main plane is used as an emitting plane and a wedge plane is defined by a flat plane intersecting said incident main plane at a predetermined angle;
   wherein said optical system is constructed in such a manner that, in an forward optical path in which a divergent light beam emitted by one of said semiconductor lasers travels to said incident main plane at which the incident light beam is refracted to an innerplane of said emitting plane at which the refracted light beam is partially reflected to said wedge plane at which the partially reflected light beam is refracted to said objective lens at which the refracted light beam is converged onto said optical disc for forming a light spot onto said information recording surface thereof, said incident main plane, said wedge plane and said objective lens substantially do not generate any astigmatism and, at the same time, in an backward optical path in which a return light from said light spot of the optical disc is received by said objective lens at which the received light beam is converged onto said wedge plane at which the converged light beam is refracted to said emitting plane at which the refracted light beam is refracted to said four light-receiving-surface elements, said emitting plane, said wedge plane and said emitting plane give an astigmatism suitable for said four light-receiving-surface elements to said return light; and wherein the other of said semiconductor lasers is arranged in such a manner that a divergent light beam emitted by the other of said semiconductor lasers is reflected by an outer surface of said wedge plane at which the reflected light beam is guided to said objective lens along with said forward optical path.

6. An apparatus according to claim 1, wherein said optical system has a hologram optical device, said hologram optical device comprises a parallel flat plate made of an isotropic or anisotropic optical material formed with a diffraction relief for transmitting the light beam emitted by said semiconductor laser, guiding at least zero-order or first-order diffraction light to said objective lens, transmitting said return light, and guiding said at least the zero-order or first-order diffraction light to said four light-receiving-surface elements.

7. An apparatus according to claim 1, wherein said optical system has a ¼ wavelength plate and a polarization hologram optical device, and said polarization hologram optical device is made up of a uniaxial crystal plate in which a diffraction relief is formed on a main plane, transmits said light beam having a plane of vibration, diffracts the light having said plane of vibration in the direction perpendicular to said plane of vibration, and guides said return light from said light spot irradiated through said ¼ wavelength plate and said objective lens to said optical recording medium to said four light-receiving-surface elements via said ¼ wavelength plate and said polarization device, and said diffraction relief causes an astigmatism.

8. The optical pickup device according to claim 1, wherein said semiconductor lasers are mounded on said single heat sink at different side surfaces of the single heat sink.

9. An optical pickup device comprising:
a detector for detecting a light intensity;
at least two semiconductor lasers each emitting a light beam; and
a single heat sink having at least two flat side surfaces, wherein the at least two semiconductor lasers are mounted on the at least two flat side surfaces of the single heat sink, respectively.

10. The optical pickup device according to claim 9, wherein the at least two flat side surfaces do not exist on a common virtual plane.

11. The optical pickup device according to claim 9, wherein said semiconductor lasers are mounted on the single heat sink at different side surfaces of the single heat sink.

12. The optical pickup device according to claim 9, further comprising a substrate onto which said single heat sink is fixed, wherein each of said semiconductor lasers is mounted on the single heat sink at a flat side surface thereof having a different height from the substrate respectively.

13. The optical pickup device according to claim 12, wherein said single heat sink has at least one of an edge and a corner between the two flat side surfaces, said semiconductor lasers being arranged near the edge or corner so as to be away from each other via the edge or corner.

14. The optical pickup device according to claim 13, wherein said edge or corner may be rounded, chamfered, or divided into a plurality of edges or corners.

* * * * *